(12) United States Patent
Touzet et al.

(10) Patent No.: US 8,361,949 B2
(45) Date of Patent: Jan. 29, 2013

(54) TREATMENT ENABLING THE REMOVAL OF A COATING AND/OR STAIN FROM A CONSTRUCTION MATERIAL

(75) Inventors: Sylvie Touzet, Antony (FR); Evelyne Prat, Pantin (FR); Florence Deschaseaux, Paris (FR); Valérie Billebaud, Asnieres-sur-seine (FR)

(73) Assignee: Rhodia Operations, Aubervilliers (FR)

( * ) Notice: Subject to any disclaimer, the term of this patent is extended or adjusted under 35 U.S.C. 154(b) by 570 days.

(21) Appl. No.: 12/519,494

(22) PCT Filed: Dec. 7, 2007

(86) PCT No.: PCT/FR2007/002015
§ 371 (c)(1),
(2), (4) Date: Jan. 13, 2010

(87) PCT Pub. No.: WO2008/087271
PCT Pub. Date: Jul. 24, 2008

(65) Prior Publication Data
US 2010/0137183 A1   Jun. 3, 2010

(30) Foreign Application Priority Data

Dec. 18, 2006  (FR) ...................... 06 11016

(51) Int. Cl.
*C11D 7/22* (2006.01)
*C11D 7/26* (2006.01)
*C11D 7/50* (2006.01)

(52) U.S. Cl. ........ 510/240; 510/200; 510/201; 510/202; 510/203; 510/241; 510/242; 510/238; 510/505; 510/174; 427/402; 427/408; 427/409

(58) Field of Classification Search ................ 510/200, 510/201, 202, 203, 240, 241, 242, 238, 505, 510/174; 427/402, 408, 409
See application file for complete search history.

(56) References Cited

U.S. PATENT DOCUMENTS

| | | | | |
|---|---|---|---|---|
| 5,691,439 A * | 11/1997 | Slack et al. | ...................... | 528/49 |
| 5,714,095 A | 2/1998 | Henrio et al. | | |
| 6,057,276 A * | 5/2000 | Smith | ........................... | 510/174 |
| 6,346,331 B2 * | 2/2002 | Harvey et al. | ................. | 428/429 |
| 6,410,095 B1 * | 6/2002 | Brahm et al. | ............... | 427/385.5 |
| 6,974,605 B2 * | 12/2005 | Macris et al. | ............... | 427/407.1 |
| 7,052,770 B2 | 5/2006 | Furuya et al. | | |
| 7,105,598 B2 * | 9/2006 | Terry et al. | ...................... | 524/837 |
| 2001/0056157 A1 * | 12/2001 | Terry et al. | ...................... | 524/588 |
| 2002/0182334 A1 | 12/2002 | Marzolin et al. | | |
| 2004/0038847 A1 * | 2/2004 | Gross | ........................... | 510/424 |
| 2004/0097647 A1 * | 5/2004 | Terry et al. | ...................... | 524/837 |
| 2005/0136217 A1 | 6/2005 | Barthlott et al. | | |
| 2007/0181166 A1 * | 8/2007 | Noth | ............................... | 134/42 |
| 2007/0190258 A1 * | 8/2007 | Lewin et al. | ................ | 427/407.1 |
| 2007/0213492 A1 * | 9/2007 | Mowrer et al. | ................. | 528/17 |

* cited by examiner

Primary Examiner — Gregory DelCotto
(74) Attorney, Agent, or Firm — Hunton & Williams, LLP

(57) ABSTRACT

The invention relates to a treatment that can be used to remove a coating and/or stain from a construction material, such as anti-graffiti treatment. The inventive treatment uses a beta-dicarbonyl product.

12 Claims, 1 Drawing Sheet

TREATMENT ENABLING THE REMOVAL OF A COATING AND/OR STAIN FROM A CONSTRUCTION MATERIAL

CROSS-REFERENCE TO RELATED APPLICATIONS

This application is the U.S. National Phase Application of International Application No. PCT/FR2007/002015, filed Dec. 7, 2007, which claims the benefit of French Application No. FR 0611016, filed Dec. 18, 2006, the entire contents of which is incorporated by reference herein.

FIELD OF THE INVENTION

The present invention relates to a treatment for facilitating the removal of a coating and/or soiling on a building material. It may be, for example, an anti-graffiti treatment. The treatment uses a β-dicarbonyl product.

BACKGROUND

In order to remove coatings and/or soiling, for instance graffiti, from building materials, treatments directed toward facilitating their removal are used. The treatment is typically applied to the material. If someone produces graffiti, then the material is cleaned using a suitable composition. Pretreatment facilitates the removal.

For these treatments, it is known practice to use polymers of fluorinated latex type. A product comprising such polymers, intended to be applied to building materials, is especially sold under the name Protectguard®. However, these polymers do not always give satisfactory results. Moreover, polymers of fluorinated latex type are expensive. There is a need for less expensive alternative treatments.

SUMMARY OF THE INVENTION

The present invention satisfies this need by proposing the use of a β-dicarbonyl product as a treatment agent for facilitating the removal of a coating and/or soiling on a building material.

The invention also relates to a process for treating a building material, comprising a step of applying a β-dicarbonyl product to the surface of the material. The invention also relates to the material thus treated, comprising the β-dicarbonyl product.

DETAILED DESCRIPTION OF PREFERRED EMBODIMENTS

The coating and/or soiling may be paint. The treatment for facilitating the removal of a coating and/or soiling on a building material may especially be a treatment for facilitating the removal of paint. The paint may be the result of graffiti, generally produced for decorative, artistic, protesting and/or denouncing purposes, but which is not desired by the proprietor, the manufacturer and/or the user of the building material. The treatment may thus be an anti-graffiti treatment.

It is mentioned that the paint may have been applied for a specific purpose by the proprietor, the manufacturer and/or the user, for example for the purpose of marking or for safety purposes. In this case, said proprietor, manufacturer and/or user will have applied the paint temporarily, with the intention of removing it thereafter.

In the present patent application, the term "building material" means any large-sized component that may be found in the public sector (building interiors accessible to a large number of people, including companies and restaurants, exterior parts of buildings accessible to third parties, transportations, floors, urban equipment, etc.), as opposed to the private sector (parts of apartments or houses not accessible to third parties).

The building material may be, for example:
- a ceramic, preferably tiling, for example of glazed earthenware type,
- a hydraulic binder material, preferably made of cement, a mortar or a concrete,
- wood,
- terracotta, for example masonry bricks, roofing tiles or earthenware floor tiles, or
- stone, preferably porous stone.

They may especially be exterior surfaces such as facades, quarry stone, balusters, cornices, statues, joints, lintels and vertical sides of apertures, facings, plinths, balconies, terraces, stair steps, footpaths and walkways, enclosures, plant stands, parking areas, main aisles, garage floors, swimming pool curbs, fountain edges, barbecues, roofs and chimneys.

They may be interior surfaces such as floors, chimney breasts, work surfaces, tiling joints, etc.

They may especially be porous materials, for instance calcareous stones, marbles, sandstones, granites, slates, terracotta (roofing tiles, building bricks or earthenware floor tiles), concrete products, renderings (MPC), reconstituted stones or bitumen.

The building, material may be a prefabricated component, or a building component prepared at the building site.

The removal of the coating and/or soiling may be total or partial. The invention makes it possible especially:
- to increase the removal relative to a removal in which no treatment has been applied beforehand, and/or
- to minimize the effort and/or the amounts of removal composition, for an equivalent treatment.

For the treatment, the β-dicarbonyl product is preferably included in a liquid treatment composition. The product may be applied via any suitable means, for example by soaking, spraying, or application by brush or by roller. Means used in the field of painting and/or cleaning, for example paint guns or pressurized sprayers, may especially be used.

The amount of treatment applied may be, for example, between 0.005 and 0.5 g/m² (expressed as amount of dry β-dicarbonyl product).

The treatment may be applied once, or may be applied several times, at a chosen time interval (for example once a year).

In general, the treatment will be followed, after application of a coating and/or soiling, especially after graffiti has been produced, by a step of removing the coating and/or soiling, with the aid of a removal composition comprising a solvent and/or a stripper. As solvents that may be used, mention is made especially of ketones such as methyl ethyl ketone (MEK), dicarboxylic acid diesters, preferably dimethyl esters, for example the product sold by Rhodia under the name Rhodiasolv® RPDE. The removal compositions are also available commercially. Mention is made, for example, of the product sold under the name Graffiguard®.

It is not excluded to add to the removal composition a β-dicarbonyl product, in order to regenerate the treatment.

β-dicarbonyl Product

The β-dicarbonyl product may be a β-dicarbonyl compound, or a mixture of β-dicarbonyl compounds or a complex mixture comprising at least one β-dicarbonyl compound, these mixtures comprising at least 5% by weight, preferably at least 10% by weight, preferably at least 50% by weight and preferably at least 80% by weight of β-dicarbonyl compounds.

The β-dicarbonyl compounds and processes for preparing them are known to those skilled in the art. Such compounds are commercially available. Depending on the process employed, optional steps of purification, recovery and/or upgrading of by-products, and depending, more generally, on the demands expected for the product, different types of product may be found:
- pure or virtually pure β-dicarbonyl compounds, comprising, for example, at least 95% by weight or even at least 99% by weight of a β-dicarbonyl product,
- mixtures of β-dicarbonyl compounds, in which the β-dicarbonyl compounds are pure or virtually pure, comprising, for example, at least 95% of β-dicarbonyl compounds,
- complex mixtures, comprising a β-dicarbonyl compound or a mixture of β-dicarbonyl compounds, and by-products or impurities that are not β-dicarbonyl compounds, for example fatty acids, comprising at least 5% by weight, preferably at least 10% by weight, preferably at least 50% by weight, preferably at least 80% by weight and generally less than 95% by weight of β-dicarbonyl compounds. Depending on the case, especially in association with the content of β-dicarbonyl compounds, these products may be referred to as "crude products", "heavy residues" or "products derived from heavy residues".

The weight proportions of β-dicarbonyl compounds may especially be precisely evaluated by gas chromatography, in which the results as percentages are equated to weight proportions. For the use of this analysis, 30 mg of product are diluted in 1 ml of chloroform, esterified (it is more exactly the acids that may be included in the product that are esterified) using an excess of diazomethane until a persistent yellow color is obtained (the excess is subsequently removed), followed by adding 20 ml of trimethylpentane. In a faster and less precise manner, but which is sufficient as a first approximation, the content of β-dicarbonyl compounds may be determined by potentiometry (the amount of acids is determined by potentiometry and is then deducted from the product).

The β-dicarbonyl compound may especially be in totally organic form or in the form of a complex of a metal, an alkali metal or an alkaline-earth metal, for example a zinc or calcium complex.

The β-dicarbonyl compound may be obtained via a condensation reaction of an ester with a ketone in the presence of an alkaline agent, typically a strong base such as an amide or an alkoxide.

More especially, the ester used in the abovementioned condensation reaction corresponds to the following formula: $R^{1'}COOR^{2'}$ in which $R^{1'}$ represents a hydrocarbon-based radical containing 1 to 30 carbon atoms, optionally interrupted with one or more groups —O—, —CO—O— or —CO—; $R^{2'}$ represents a hydrocarbon-based radical containing 1 to 4 carbon atoms.

More particularly, the radical $R^{1'}$ represents a linear or branched $C_1$-$C_{30}$ and preferably $C_1$-$C_{24}$ alkyl or alkenyl radical; a $C_6$-$C_{30}$ aryl radical, optionally substituted with at least one $C_1$-$C_{10}$ alkyl or $C_1$-$C_{10}$ alkoxy radical, a halogen atom and/or a silicon atom; a $C_3$-$C_{14}$ cycloaliphatic radical. Said radical may optionally comprise carbon-carbon double bonds and may optionally be interrupted with one or more groups —O—, —CO—O— or —CO—.

Among the possible radicals, mention may be made of the lauryl, myristyl, stearyl, isostearyl, palmityl, behenyl, lignoceryl, oleyl, palmitoleyl, linoleyl, linolenyl or benzyl radical optionally bearing one or more alkyl or alkoxy substituents.

As regards the radical $R^{2'}$, it preferably represents a $C_1$-$C_4$ alkyl radical. It should be noted that, depending on the nature of the alkaline agent, it may be advantageous to choose the radical $R^{2'}$ such that the corresponding alcohol is volatile under the conditions of the condensation reaction. In a particularly advantageous manner, said radical is a methyl radical.

It should be noted that the ester may be in its simple form, or in a partially or totally condensed form. According to one embodiment, if the ester contains a hydrogen in the alpha position relative to the ester group, it may then be used partially or totally in the form of a β-keto ester. In this case, in the formula of the ester given previously, the radical $R^{1'}$ may be replaced with $R^{1'}COR'^1$, in the formula of the ester given above. In this case, this formula becomes $R^{1'}COR'^1COOR^{2'}$, $R^{1'}$ having the same meaning as above, and similarly for $R'^1$, except for the fact that it is a divalent radical.

The ketone used in the condensation reaction more particularly corresponds to the following formula: $R^3COCH_2R^4$, in which $R^3$ represents a hydrocarbon-based radical containing 1 to 30 carbon atoms, optionally interrupted with one or more groups —O—, —CO—O— or —CO—; $R^4$ represents a hydrogen atom or a hydrocarbon-based radical containing not more than 4 carbon atoms.

Preferably, the radical $R^3$ represents a linear or branched $C_1$-$C_{30}$ and preferably $C_1$-$C_{24}$ alkyl or alkenyl radical; a $C_6$-$C_{30}$ aryl radical, optionally substituted with at least one $C_1$-$C_{10}$ alkyl or $C_1$-$C_{10}$ alkoxy radical, a halogen atom and/or a silicon atom; a $C_3$-$C_{14}$ cycloaliphatic radical. Said radical may optionally comprise carbon-carbon double bonds and may be optionally interrupted with one or more groups —O—, —CO—O— or —CO—.

Among the possible radicals, mention may be made of the lauryl, myristyl, stearyl, isostearyl, palmityl, behenyl, lignoceryl, oleyl, palmitoleyl, linoleyl, linolenyl or benzyl radical optionally bearing one or more alkyl or alkoxy substituents.

As regards the radical $R^4$, it preferably represents a $C_1$-$C_4$ alkyl radical. In a particularly advantageous manner, said radical is a methyl radical.

Usually, the mole ratio of the ketone to the ester is in the range from 2/3 to 1/1. Preferably, the ester is present in an excess of up to 30 mol % and very preferentially in an excess of from 5 mol % to 20 mol % relative to the ketone.

The β-dicarbonyl compound may thus be of formula $R^{1'}COCH_2COR^3$, in which $R^{1'}$ and $R^3$ have the meanings detailed previously. It is not excluded for $R^{1'}$ and $R^3$ to be linked together so that the β-dicarbonyl compound is in the form of a ring.

According to one embodiment of the invention, the reaction is performed in the presence of a solvent. The solvent is chosen from compounds that are inert under the reaction conditions.

Conventionally, it is chosen from aromatic, aliphatic and cyclic hydrocarbons; hydrocarbon-based fractions and ethers.

Preferably, the solvent is chosen from alkylbenzenes, for instance toluene, dialkylbenzenes and trialkylbenzenes, but also isopropyl ether; toluene and xylene being preferred.

Moreover, the condensation reaction is performed in the presence of a basic agent (or alkaline agent). More especially, said agent is chosen from amides, hydrides and alkoxides containing 1 to 4 carbon atoms.

Usually, the number of moles of basic agent present during the reaction is such that the mole ratio: basic agent/sum of the moles of ester and ketone is in the region of 1.

According to a first embodiment, the condensation reaction is performed in the presence of a sodium hydride, or preferably of sodium amide.

As a result of the presence of sodium amide, it is preferable to perform the reaction under an inert atmosphere, preferably by flushing with nitrogen.

In addition, the reaction is performed at a temperature preferably of between 30 and 60° C.

According to a second embodiment of the invention, the basic agent is a sodium alkoxide, the corresponding alcohol of which is volatile under the conditions of the condensation reaction. Preferably, the alkoxide is sodium methoxide.

In addition, in this case, the solvent is chosen from those with a boiling point at least 20° C. higher than the reaction temperature.

Preferably, the reaction is performed in the solvent at reflux.

Whatever the variant adopted, the reaction is preferably performed by introducing the ketone into the ester comprising the basic agent and, where appropriate, the solvent.

Depending on the nature of the basic agent, it is wise to provide means for recovering either the ammonia produced or the alcohol produced.

In the particular case in which said agent is an alkoxide, removal of the alcohol gradually as it is formed in the reaction mixture represents a very advantageous characteristic of the process and makes it possible, inter alia, to increase the yield of desired β-dicarbonyl compound.

At the end of the reaction, once again irrespective of the variant adopted, the reaction medium is preferably acidified.

With this aim, the reaction mixture is introduced into an aqueous solution of an acid, the preferred acids being acetic acid, hydrochloric acid and sulfuric acid. The pH of the aqueous layer is adjusted to a value preferably of between 1 and 3.

After washing with water at least once, the solvent is removed via any suitable means, for example by evaporation, and a crude product is obtained.

This crude product comprises the desired β-dicarbonyl compound ($R^1COCH_2COR^3$), and also symmetrical homologues ($R^{1'}COCH_2COR^{1'}$, $R^3COCH_2COR^3$), along with by-products. It may thus be a "complex mixture" as explained above.

It should be noted that the exact composition of the by-products is very complex to evaluate. They may especially originate from crotonization reactions of the β-dicarbonyl compounds with each other, or from the appearance of species comprising amide functions if the basic agent comprises nitrogen.

According to a first possibility, the β-dicarbonyl product comprises a mixture corresponding to the crude product obtained from the condensation reaction.

In the case of this possibility, the content of β-dicarbonyl compounds is generally between 40% and 95% by weight and preferably between 40% and 80% by weight, and the content of by-products is from 5% to 60% by weight and preferably from 20% to 60% by weight.

According to this possibility, the β-dicarbonyl product may be in the form of a divided solid, which, depending on the forming methods used, may be in the form of a powder or of flakes.

Among the methods for forming the composition, mention may be made, without wishing to be limited, of flaking, precipitation in a solvent, cryogenic milling and spraying/drying in a stream of gas.

Flaking makes it possible to remove the solvent from the reaction mixture by passing the solution through a permanently cooled rotating drum. The product solidified at the surface of the drum is recovered with a doctor blade, in the form of flakes.

The technique of precipitation in a solvent consists, for example, in pouring the crude product into a compound at room temperature, which is not a good solvent at this temperature for this crude product, for instance ethanol or methanol, and the precipitate formed is separated out.

As regards cryogenic milling, the process is generally performed by introducing into a mill liquid nitrogen or any other inert liquid gas such as $CO_2$, and the crude reaction product in the form of pieces from a few millimeters to a few centimeters obtained by coarse milling or alternatively via the flaking technique.

Finally, the spraying/drying method consists in spraying the crude reaction product in melt form through a stream of cold inert gas introduced counter-currentwise or co-currentwise.

According to a second possibility, the β-dicarbonyl product comprises a mixture corresponding to the product recovered during a purification step and after separation from the β-dicarbonyl compound.

According to this variant, the crude product is recrystallized from a suitable solvent, for example an alcohol such as ethanol. The purified β-dicarbonyl compound is separated, especially by filtration, from a solution comprising the solvent and a mixture of by-products and of β-dicarbonyl compounds. The solution is then treated so as to remove the crystallization solvent, for example by evaporation. Product A is thus recovered according to this second possibility.

In accordance with this possibility, the content of β-dicarbonyl compounds is generally between 5% and less than 40% by weight, and the content of by-products is between 60% and 95% by weight.

The β-dicarbonyl product according to this second possibility may be in a solid and/or pasty form.

The β-dicarbonyl product is advantageously included in a liquid treatment composition. The treatment composition may also comprise water and/or a solvent and/or a stripper. If the β-dicarbonyl product is used alone, one that is liquid will preferably be used.

β-Dicarbonyl products that may be used are especially the products comprising:

5-methyl-1-phenylhexane-1,3-dione,
octanoylbenzoylmethane,
heptanoylbenzoylmethane,
stearoylbenzoylmethane,
dibenzoylmethane, and/or
calcium or zinc acetylacetonate.

Such products are sold by the company Rhodia under the name Rhodiastab®.

It is mentioned that the β-dicarbonyl product may be combined with other treatment agents, especially with polymers of fluorinated latex type, such as those included in the product sold under the name Graffiguard®. The combination may be typically prepared in a treatment composition. Such a composition may impart complementarity, i.e. an action on a wider range of coatings and/or soiling, and/or may contribute toward reducing the cost of treatments.

The treatment composition may also comprise a vector, for example a solvent. Suitable solvents have been mentioned hereinabove for the removal composition. The composition may comprise other additives, which may be chosen from the additives commonly used for this type of treatment. They may be, for example, antifoams or thickeners. Preferably, the treatment composition comprises at least 10% by weight, preferably at least 25% by weight, and up to 100% by weight or less, for example up to 90% by weight, of the β-dicarbonyl product.

Other details or advantages of the invention may emerge in the light of the nonlimiting examples that follow.

EXAMPLES

The products below are used:
Treatments:
"Rh92": Rhodiastab® 92
"Rh92/RPDE": mixture of 50% by weight of Rhodiastab® 92 and 50% by weight of Rhodiasolv® RPDE
Protectguard®, sold by Guard Industrie, distributed in the Point P shops (comparative)
Novipro®, sold per product by a company that may be contacted at the telephone number (+33) 825 077 077 (comparative)
Material:
exterior floor tile with a porous face and a nonporous face, similar to the 36×36 tile distributed in the Point P shops, under the reference 142 1408,
pinewood panel,
breeze block.
Paint Simulating Graffiti:
fluorescent orange aerosol paint "Orange Fluo TP" sold by the company Soppec, distributed in the Point P shops.
Removal Composition:
A: Rhodiasolv® RPDE
B: Graffiguard® 2030, sold by Guard Industrie, distributed in the Point P shops.
C: Graffiguard® 2050, sold by Guard Industrie, distributed in the Point P shops.

Tests

Tests are performed in which a treatment is applied ("impregnation"), a paint is applied ("application"), the paint is aged under various conditions ("aging"), the paint is removed ("deinking"), and the amount of paint removed is then evaluated visually (a grade is given). Details regarding the various operations are given hereinbelow.

Impregnation on a Floor Tile
3 ml of the treatment are applied to the nonporous surface and 6 ml to the porous surface (at 0.0533 g/m²), it is spread with absorbent paper and is dried at room temperature.

Impregnation on Wood
The treatment is applied by brush.

Application
The paint is applied via a spray can, in three coats.

Aging
Different types of aging are performed:
Aging 1: drying for 24 hours at room temperature
Aging 2: drying for 24 hours at room temperature followed by 30 days in the Xenotest (which simulates UV and rain)
Aging 3: drying for 24 hours at room temperature and then for 4 weeks in saline mist (5% NaCl, 35° C.).

Deinking
2 ml of removal composition are applied for 5 minutes to tiles lying horizontally, and are then cleaned off with absorbent paper.

Grading

Figure 1:
FIG. 1 illustrates a surface that is not cleaned.
Figure 2:
FIG. 2 illustrates a surface that is 20% cleaned.
Figure 3:
FIG. 3 illustrates a surface that is 40% cleaned.
Figure 4:
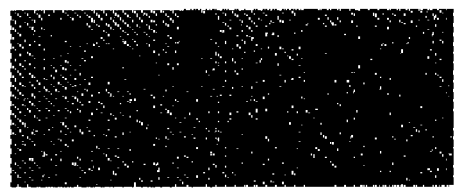
FIG. 4 illustrates a surface that is 60% cleaned.
Figure 5:
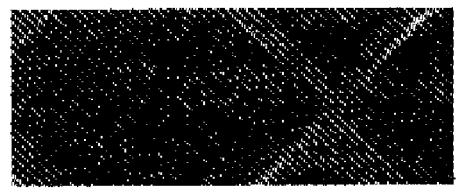
FIG. 5 illustrates a surface that is 80% cleaned.
Figure 6:
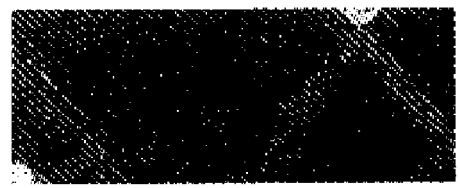
FIG. 6 illustrates a surface that is 100% cleaned.

| Grade | Evaluation | Photograph |
|---|---|---|
| 0 | The surface is not cleaned | FIG. 1 |
| 1 | 20% of the surface is cleaned | FIG. 2 |
| 2 | 40% of the surface is cleaned | FIG. 3 |
| 3 | 60% of the surface is cleaned | FIG. 4 |
| 4 | 80% of the surface is cleaned | FIG. 5 |
| 5 | 100% of the surface is cleaned | FIG. 6 |

Photographs are taken and presented in the figures.

Examples 1 to 13

Treatment of the Smooth Face of the Tile

The letter C indicates a comparative example. The grade is reported with the various treatments, the various agings and the various removal compositions.

| | | Aging 1 | |
|---|---|---|---|
| Example | Treatment | Removal composition A | Removal composition B |
| 1C | None | 0.5 | 1 |
| 2C | Protectguard | 4.5 | 5 |
| 3 | Rh92 | 4.5 | 4.5 |
| 4C | Novipro | 2 | 4.5 |
| 5 | Rh92/RPDE | 4 | 4.5 |

| | | Aging 2 | |
|---|---|---|---|
| Example | Treatment | Removal composition A | Removal composition B |
| 6C | Protectguard | 3.5 | 4.5 |
| 7 | Rh92 | 3 | 4.5 |
| 8C | Novipro | 3 | 4 |
| 9 | Rh92/RPDE | 2.5 | 3.5 |

| | | Aging 3 | |
|---|---|---|---|
| Example | Treatment | Removal composition A | Removal composition B |
| 10C | Protectguard | 3 | 4 |
| 11 | Rh92 | 2.5 | 4 |
| 12C | Novipro | 1 | 4 |
| 13 | Rh92/RPDE | 1 | 4 |

Examples 14 to 27

Treatment of the Porous Face of the Tile

The letter C indicates a comparative example. The grade is reported with the various treatments, the various agings and the various removal compositions.

|         |              | Aging 1 | |
|---------|--------------|---------|---------|
| Example | Treatment | Removal composition A | Removal composition B |
| 14C | None | 0 | 1 |
| 15C | Protectguard | 2.5 | 4.5 |
| 16 | Rh92 | 3.5 | 5 |
| 17C | Novipro | 0.5 | 4.5 |
| 18 | Rh92/RPDE | 0.5 | 5 |

|         |              | Aging 2 | |
|---------|--------------|---------|---------|
| Example | Treatment | Removal composition A | Removal composition B |
| 19C | Protectguard | 2.5 | 4.5 |
| 20 | Rh92 | 1 | 4.5 |
| 21C | Novipro | 2.5 | 4.5 |
| 22 | Rh92/RPDE | 2.5 | 4.5 |

|         |              | Aging 3 | |
|---------|--------------|---------|---------|
| Example | Treatment | Removal composition A | Removal composition B |
| 23C | Protectguard | 0 | 3.5 |
| 24 | Rh92 | 1 | 4 |
| 25C | Novipro | 0.5 | 4 |
| 26 | Rh92/RPDE | 0.5 | 5 |

It is found that the treatments of the invention, for an equivalent removal composition, give results in terms of paint removal that are equal or superior to those of the comparative examples.

Examples 27 and 28

Treatment of Pinewood

The letter C indicates a comparative example. The grade is reported with or without the treatment, and the removal composition A.

| Example | Treatment | Aging 1 Removal composition A |
|---------|-----------|-------------------------------|
| 27C | None | 0 |
| 28 | Rh92/RPDE | 4.5 |

Examples 29 and 30

Treatment of a Breeze Block

The letter C indicates a comparative example. The grade is reported with or without the treatment, and the various removal compositions.

|         |           | Aging 1 | |
|---------|-----------|---------|---------|
| Example | Treatment | Removal composition A | Removal composition B |
| 29C | None | 0.5 | 2.5 |
| 30 | Rh92/RPDE | 1 | 4 |

The treatment prevents the paint from impregnating.

The invention claimed is:
1. A process for treating a building material to facilitate the removal of a paint, comprising:
applying to the material a composition comprising a β-dicarbonyl compound selected from the group consisting of:
5-methyl-1-phenylhexane-1,3-dione,
octanoylbenzoylmethane,
heptanoylbenzoylmethane,
stearoylbenzoylmethane,
dibenzoylmethane,
calcium and zinc acetylacetonate, or
a mixture thereof;
wherein said composition comprises at least 50% by weight of at least one of the β-dicarbonyl compounds.
2. The process of claim 1, wherein said composition is a liquid treatment composition.
3. The process of claim 1, further comprising the step of removing the paint, with the aid of a removal composition comprising a solvent and/or a stripper.
4. The process of claim 1, wherein said building material comprises:
a ceramic,
a hydraulic binder material,
wood,
terracotta, or
stone.
5. The process of claim 1, wherein the composition comprises water and/or a solvent and/or a stripper.
6. The process of claim 1, wherein said composition comprises a mixture of the β-dicarbonyl compounds or a complex mixture comprising at least one of the β-dicarbonyl compounds.
7. The process of claim 1, wherein said composition comprises at least 80% by weight of at least one of the β-dicarbonyl compounds.
8. The process of claim 1, comprising applying the composition to a surface of said material.
9. A process for removing a coating and/or soiling from a building material, comprising the steps of:
applying a composition comprising at least one β-dicarbonyl compound to said material, and
partially or totally removing the coating and/or soiling from said material;
wherein said β-dicarbonyl compound comprises:
5-methyl-1-phenylhexane-1,3-dione,
octanoylbenzoylmethane,
heptanoylbenzoylmethane,
stearoylbenzoylmethane,
dibenzoylmethane,
calcium or zinc acetylacetonate, or
a mixture thereof; and
further wherein said composition comprises at least 50% by weight of at least one of the β-dicarbonyl compounds.
10. The process of claim 9, wherein said coating and/or soiling comprises a paint.

11. A process for treating a building material to facilitate the removal of a coating and/or soiling, comprising:
 applying to the material a composition comprising:
  5-methyl-1-phenylhexane-1,3-dione,
  octanoylbenzoylmethane,
  heptanoylbenzoylmethane,
  stearoylbenzoylmethane,
  dibenzoylmethane, or
  a mixture thereof.

12. The process of claim 11, wherein said coating and/or soiling comprises a paint.

* * * * *

UNITED STATES PATENT AND TRADEMARK OFFICE
CERTIFICATE OF CORRECTION

PATENT NO.        : 8,361,949 B2  
APPLICATION NO. : 12/519494  
DATED             : January 29, 2013  
INVENTOR(S)       : Touzet et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

First Day of September, 2015

Michelle K. Lee
*Director of the United States Patent and Trademark Office*